United States Patent [19]

Curren

[11] 4,000,243

[45] Dec. 28, 1976

[54] METHOD FOR MANUFACTURING PRE-INKED STAMPS

[75] Inventor: Richard A. Curren, Chicago, Ill.

[73] Assignee: Consolidated Business Products, Broadview, Ill.

[22] Filed: Nov. 6, 1975

[21] Appl. No.: 629,489

Related U.S. Application Data

[60] Continuation-in-part of Ser. No. 491,408, July 24, 1974, which is a division of Ser. No. 410,467, Oct. 29, 1973, Pat. No. 3,850,565.

[52] U.S. Cl. ................................ 264/293; 264/321

[51] Int. Cl.$^2$ ........................................ B29D 27/00

[58] Field of Search ............................ 264/293, 321

[56] References Cited

UNITED STATES PATENTS

| | | | |
|---|---|---|---|
| 2,914,109 | 11/1959 | Hsu | 264/293 X |
| 2,946,713 | 7/1960 | Dusina | 264/321 X |
| 3,818,085 | 6/1974 | Marsland | 264/293 X |
| 3,844,876 | 10/1974 | Wilson et al. | 264/321 X |

*Primary Examiner*—Richard R. Kucia
*Attorney, Agent, or Firm*—Alter and Weiss

[57] ABSTRACT

A method for manufacturing pre-inked stamps in which a compact cabinet containing a cold press and a hot plate with means for insuring the safe usage of both the cold press and hot plate is used. Porous thermoplastic material is compressed without heat against a die; thereafter, heat is applied to the porous material, causing it to shrink and retain a memory of the die impressions.

12 Claims, 6 Drawing Figures

METHOD FOR MANUFACTURING PRE-INKED STAMPS

This is a continuation-in-part of a division (Ser. No. 491,408 filed July 24, 1974) of a patent application Ser. No. 410,467 filed Oct. 29, 1973, which has since issued as a U.S. Pat. No. 3,850,565 on Nov. 26, 1974. The present invention relates generally to methods for manufacturing marking stamps and more particularly to a method for embossing porous thermoplastic material used in making pre-inked stamps, wherein the material is compressed against a die or mold having formed therein the graphics to appear on the pre-inked stamp. While under pressure, the material is heated without melting, and thus the graphics are embossed on the material.

Use of stamps formed from porous material impregnated with ink has supplanted the familiar combination of rubber stamp and stamp pad, while at the same time making practical and economical such innovations as stamps reproducing several colors simultaneously. Past apparatus and methods used for embossing the porous stamp material suffered from many inconvenient features. Cold presses used to compress stamp material against dies had a tendency to tip over when used, and accidental contact with the hot plate used in curing the stamp material often caused unfortunate burns. The present method uses a unique self-locking chase which is closed with a cold press, thus compressing the stamp material; thereafter, in a separate operation, the chase is heated. Thus, temperature and pressure sufficient to emboss the stamped material are supplied.

The invention has, therefore, the following objects:

To provide unique and novel methods for use and manufacturing pre-inked stamps;

To carry out such methods in compact cabinets;

To provide methods for manufacturing pre-inked stamps wherein a unique self-locking chase is used for holding the master die, having thereon the graphics which are to ultimately appear on the stamp, and the porous stamp material, on a hot plate so that sufficient heat and pressure to emboss the material is inherently applied;

To provide methods for manufacturing pre-inked stamps in connection with a cold press and a hot plate, wherein means are provided for preventing the cold press from tipping over when used, and means are provided to insure that accidental burns do not occur through contact with the hot plate.

A preferred embodiment of the method uses apparatus as described in the parent to this application, U.S. Pat. No. 3,850,565, including a single upstanding cabinet having therein a cold press and a hot plate. A console or chase is provided for holding the porous stamp material and the plastic die used for embossing the stamp material to create the pre-inked stamp. The hot plate is protected by a safety plate which slidingly fits thereover to prevent unfortuitous burns.

A base safety plate assures the stability of the apparatus even while the cold press is used. A thermostat assures that the hot plate is at the right temperature to process the stamp material in the chase. The unique chase assures proper pressure on the material to emboss the porous stamp material with the graphics appearing on the die.

The apparatus provides an efficient and compact package enabling the manufacture of pre-inked stamps with ease and dispatch and with a minimum of risk of burns or of tipping the apparatus. The apparatus can be used by relatively unskilled production people.

For purposes of facilitating and understanding the above-described method, the accompanying drawings illustrate a preferred embodiment thereof which, when considered in connection with the following description of the method and its operation, illustrates many easily understood advantages.

FIG. 1 is perspective view of the apparatus used for manufacturing pre-inked stamps embodying the principles of the method and showing the chase in position to be placed in the cold press;

FIG. 1*a* is a plan view of details of the mounting of the top plate of the apparatus of FIG. 1;

Figure 1A:
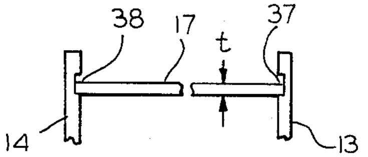
Figure 1:
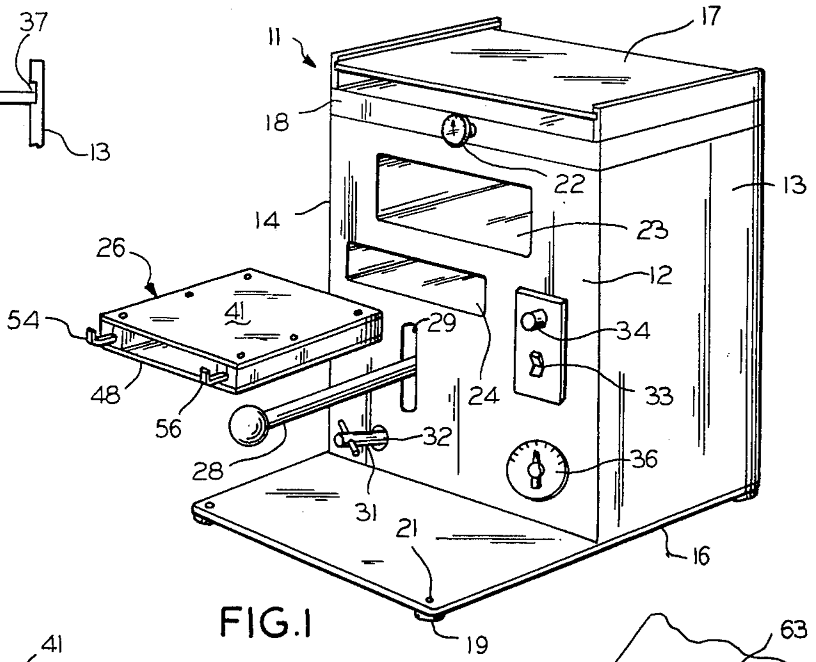
Figure 3:
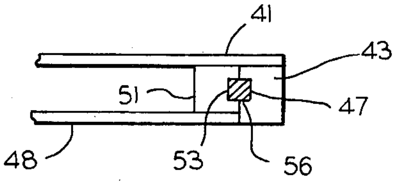
FIG. 3 is a partial sectional view showing the arrangement of the rods lockingly interconnecting the top and bottom of the chase.

Referring to FIG. 1, the apparatus for processing the porous rubber-like material to manufacture pre-inked stamps is shown generally at 11. It comprises a cabinet having a front panel 12, side panel walls 13 and 14 and means for stabilizing the apparatus to keep it from tipping, such as the extended base 16. There is a slidable top plate 17 which, when moved aside, discloses a hot plate 18.

The entire cabinet preferably rests on small rubber legs, such as rubber leg 19, fastened to the extended base 16, by fasteners, such as indicated at 21. The front panel 12 includes a temperature indicator 22 for relating the exact temperature of the hot plate 18. A storage area 23 is accessible through the front panel and is used for storing small accessories and supplies.

A cold press is accessible through slot 24 in the front panel 12. A chase 26 fits into the slot 24 where it can be compressed under hydraulic pressure or the like operating the cold press 27.

Figure 5:
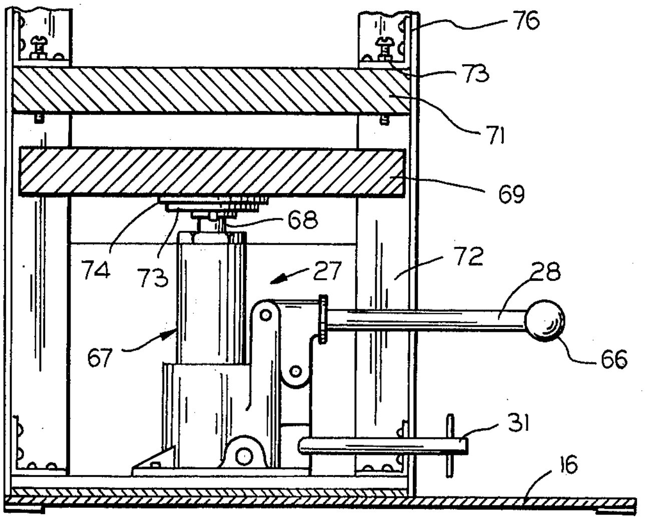
FIG. 5 is a partial cross sectional view of the apparatus showing the cold press.

The cold press 27 is shown in greater detail in FIG. 5. The press applies pressure to chase 26 in slot 24 when handle 28, which passes through slot 29 in the front panel, is operated. A releasing valve operated by handle 31 which passes through aperture 32 in the front panel 12 is provided on the hydraulic press.

The front panel 12 also contains the on-off power switch 33 and associated pilot light 34. The pilot light is connected in the circuitry so that when the power is on the pilot light 34 is also lit.

Means are provided for accurately setting the temperature of the hot plate. More particularly, thermostatic control 36 is provided on the front panel 12.

Means are provided for sliding the top plate of the cabinet 17 back and forth to either cover hot plate 18 and whatever is resting on the hot plate, such as chase 26, or to expose the hot plate and chase. More particularly, as shown in FIG. 1*a*, the side plates 13 and 14 contain slots 37 and 38 into which plate 17 slidably fits. The thickness of plate 17 is less than the height of the slot, making it easy to slide the plate 17 back and forth.

Figure 2:
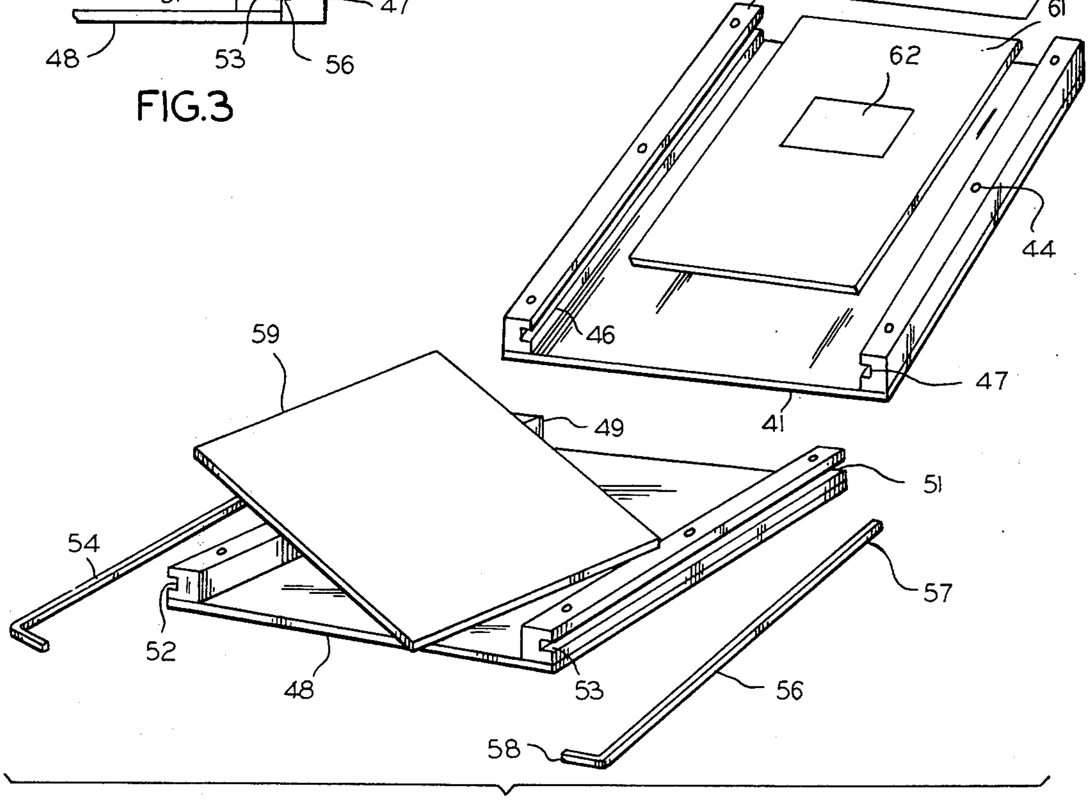
FIG. 2 is a perspective view of the chase, showing also the plastic die and porous stamp material used in the pre-inked stamp, as well as the release paper normally utilized in the manufacture of the stamp.

The exploded view of FIG. 2 shows the details of the chase 26. More particularly, the chase is comprised of bottom plate 41 having oppositely disposed bearer blocks 42 and 43, whose ends are tangential to the side ends of plate 41. The blocks 42 and 43 are held onto the plate with threaded fasteners as shown at 44. In a preferred embodiment the threaded fastener passes through an untapped hole in the plate and threads into a tapped hole in the bearer block. Each of the bearer blocks 42 and 43 has a slot 46 and 47, respectively, running the length thereof. The bearer blocks 43 and 42 are mounted on the plate so that the slots face each other. A top plate 48, that is narrower than the bottom plate, also has bearer blocks 49 and 51 oppositely disposed and tangential to the side end of the plate. These blocks are held onto plate 48 in the same manner as blocks 42 and 43. These top plate bearer blocks also have slots running the length thereof, such as slots 52 and 53, respectively. The slots 52 and 53 are aligned with the slots 46 and 47 of the plate 41. The slots face away from each other on the bearer blocks of plate 48. The bearer blocks are dimensioned so that when the plate 48 is placed onto the plate 41, the bearer blocks are contiguous to each other with the slots 46, 52 and 47 aligned with each other to make one large slot. The large slot of the combined blocks provide an opening for receiving locking rods 54 and 56 therein. The locking rods are shown as L-shaped longitudinal rectangles having a long side 57, for example, and a short side 58 on locking rod 56. The L-shaped portions provide handles for removing the locking rods from the slots when it is desired to disassemble the chase.

A piece of porous stamp material 59 is positioned between the plates, juxtaposed to the bakelite plastic die plate 61, having the depressed area shown at 62 upon which is embossed the graphics desired to appear on the finished stamp.

A piece of release paper 63 is placed between the plastic die 61 and the porous stamp material 59. The dimensions of the stamp material 59 and the plate 61 are such that when these units are placed between plates 41 and 48, the slots 47, 53 of the plates do not align and therefore the plates cannot be locked.

The porous stamp material used should be of sufficient absorbency to retain an adequate supply of ink, while at the same time be permanently deformable by heat and pressure to retain a plastic memoray of the impressions formed in die plate 61. It has been found that a polyvinyl chloride foam may successfully be used to carry out such a process. Such a foam is described in U.S. Pat. No. 3,506,749, entitled EMBOSSING POROUS STAMP MATERIAL, presently assigned to the assignee of the pending present application. By way of example, several typical formulations of appropriate polyvinyl chloride formulations are presented herein. The polyvinyl chloride base for said preparations is furnished by a resin commercially available and known generically as Plastisol. One such compound is made and sold by J. G. Milligan Company, Oak Creek, Wis.

The following examples of polyvinyl chloride foam formulations have pore and distortion characteristics suitable for the manufacture of pre-inked stamps. These formulations are included by way of example only, and are not intended to limit the method described herein.

EXAMPLE 1

| | Parts (substantially) |
|---|---|
| Plastisol resin | 100 |
| Dipropylene glycol dibenzoate | 45 |
| Dicapryl phthalate | 35 |
| Low temperature epoxy plasticizer | 5 |
| Frothing aid and stabilizer | 15 |
| Nytal 200-L | 15 |

EXAMPLE 2

| | Parts (substantially) |
|---|---|
| Plastisol resin | 100 |
| Butyl benzyl phthalate | 45 |
| Dioctyl phthalate | 35 |
| Dyphos | 5 |
| Frothing aid and stabilizer | 15 |

EXAMPLE 3

| | Parts (substantially) |
|---|---|
| Plastisol resin | 100 |
| Butyl benzyl phthalate | 35 |
| Dicapryl phthalate | 30 |
| Low temperature epoxy plasticizer | 5 |
| Frothing aid and stabilizer | 12 ½ |

EXAMPLE 4

| | Parts (substantially) |
|---|---|
| Plastisol resin | 100 |
| Dipropylene glycol dibenzoate | 45 |
| Dioctyl phthalate | 15 |
| Low temperature epoxy plasticizer | 5 |
| Cresyl diphenyl phosphate | 20 |
| Frothing aid and stabilizer | 15 |

EXAMPLE 5

| | Parts (substantially) |
|---|---|
| Plastisol resin | 85 |
| Copolymer dispersion resin | 15 |
| Dipropylene glycol dibenzoate | 45 |
| Dioctyl phthalate | 35 |
| Low temperature epoxy plasticizer | 5 |
| Frothing aid and stabilizer | 15 |

EXAMPLE 6

| | Parts (substantially) |
|---|---|
| Plastisol resin | 60 |
| Copolymer dispersion resin | 40 |
| Low temperature epoxy plasticizer | 5 |
| Frothing aid and stabilizer | 15 |

EXAMPLE 7

| | Parts (substantially) |
|---|---|
| Plastisol resin | 100 |
| Dioctyl phthalate | 16 |
| Dipropylene Glycol dibenzoate | 45 |
| Low temperature epoxy plasticizer | 5 |
| Frothing aid and stabilizer | 11 |

For the plastisol resin, Exon 654, made by the Firestone Tire and Rubber Company, Opalon 410, made by the Monsanto Chemical Company, or Geon 121, made by B. F. Goodrich Chemical Company are typical compounds which could be used. The plastisol provides the dry resin base of polyvinyl chloride.

Typical epoxy type plasticizers include Monoplex S-73 (Rohm & Haas); and butadiene-acrylonitrile copolymers such as Hycar 1312 (B. F. Goodrich Chemical Company).

The dipropylene glycol and dicapryl phthalate are also plasticizers.

For the frothing aid and stabilizer the product "Fomade", developed by R. T. Vanderbilt Company, Inc., East Norwalk, Conn., can be used with optimum result. This is a mixture of amine soap and alkali metal soap in a liquid which is blended with the plastisol in order to incorporate air therein to form a cellular or foam product. The "Foamade" enables the fused mixture to have the physical structure of small pores of substantially uniform size and substantially even distribution throughout the foam without collapse of the foam. The alkali metal soap is an alkali metal salt of a saturated or unsaturated fatty acid including hydroxy fatty acids or mixtures thereof having from 8 to 24 carbon atoms, and preferably having 18 carbon atoms. Typical examples thereof include the potassium and sodium salts of caprylic, capric, lauric, myristic, palmitic, stearic, oleic, linoleic, linolenic and ricinoleic acids. The amine soap is an amine salt of a saturated or unsaturated fatty acid, including hydroxy fatty acids or mixtures thereof from 8 to 24 carbon atoms. Typical examples thereof include the ammonium, dimethylamine, triethanolamine and morpholine salts of caprylic, capric, lauric, myristic, palmitic, stearic, oleic, linoleic, linolenic, and ricinoleic acids. Morpholine oleate is preferred. For additional information see Waterman, et al., U.S. Pat. Nos. 3,288,729 and 3,301,798.

The Nytal is a magnesium silicate. Nytal aids in providing a more perfect blending of the ingredients and a more uniformly produced product. The Nytal is produced by the R. T. Vanderbilt Company, Inc., 230 Park Avenue, New York, N.Y., 10017. All grades of Nytal have the same average chemical composition as follows:

| | Percent |
|---|---|
| MgO | 29 |
| $SiO_2$ | 57 |
| CaO | 8 |
| $Al_2O_3$, $Fe_2O_3$ | 2 |
| Ignition loss | 4 |
| | 100 |
| $CO_2$ | .7 |

In particular Nytal 200-L was found to be most desirable. It is a "low consistency" form of Nytal.

Dyphos used above in Example 2 is a stabilizer of vinyls and particularly of the polyvinyl chloride resins. Dyphos is the dibasic lead salt of phosphorous acid. Its composition is a dibasic lead phosphite. Its formula $2PbO.PbHPO_3.\frac{1}{2}H_2O$. Dyphis is made by the National Lead Company, having its general offices at 111 Broadway, New York 6, New York.

After the ingredients are mixed and foamed by mechanical heating they are formed into slabs and placed on release paper and thereafter heated at a temperature and for a period of time to produce an end product having a physical structure containing micropores throughout which are substantially uniform in size and substantially equally distributed throughout. Slab sections sized to fit chase 26 may then be cut when needed to form stamps.

The foam from any of the above mixtures is a flexible interconnected cellular foam rubber-type material, which is not as elastic as rubber. The physical structure includes small, substantially uniformly sized pores substantially equally distributed throughout.

The plates in the unlocked condition with the material and die therein are placed into slot 24 of the press. In the press sufficient pressure is applied so the locking rods 54 and 56 can be inserted in the slots and the chase is locked together. This, of course, applies pressure, forcing the die against the porous material. The porous material, therefore, is squeezed, forming the embossed area 62 which is a mirror image of what is on the die. After the plates are locked together the chase is removed from the press and is placed on hot plate 18. Heating the chase then shrinks the porous stamp material and causes it to retain the mirror image embossment of die 62.

Figure 4:
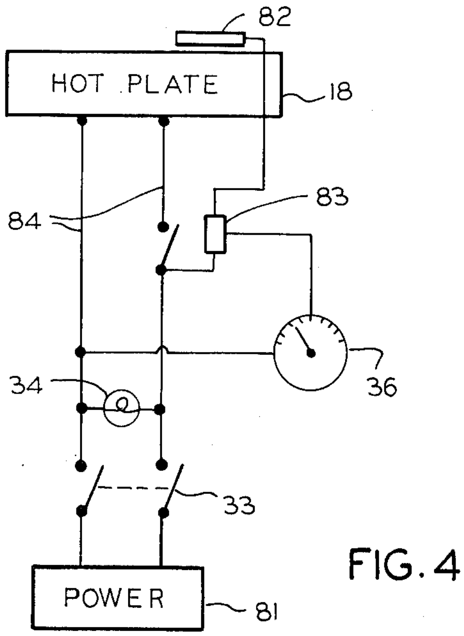
FIG. 4 is a schematic diagram showing the electrical arrangement of the apparatus.

Means, such as thermostat 36, are provided for setting the temperature to the desired level. As shown in the schematic of FIG. 4, the main power switch 33 when closed connects the line power 81 to the hot plate heating elements. A thermocouple sensor element 82 senses the temperature at the hot plate 18. As long as the sensed temperature is below the temperature set on the thermostat 36, switch 85 remains closed, enabling power to extend to the hot plate through leads 84. When the sensed temperature is above the set temperature, then control means 83 opens switch 85 to remove power from the hot plate. The control means 83 and switch 85 can be the ordinary themocouple coil and mercury switch commonly found in thermostatic controls.

As shown in FIG. 5, the hydraulic press 27 has a handle 28 with spherical end 66 thereon. The handle is used to pump the hydraulic fluid in cylinder 67, causing piston 68 to extend therefrom. The piston 68 has attached thereto plate 72 and 73 forming a base for movable platen 69. The movable platen 69 operates in conjunction with stationary platen 71 to apply the pressure to the chase that is necessary for locking the plates of chase 26 together.

As shown in FIG. 5, the apparatus is preferably constructed of corner angle irons, such as angle iron 74. The front and side panels are attached to the angle irons. The stationary platen is attached to a corner angle bracket, such as angle bracket 75 using adjustable screw and nut arrangement 76 so that the position of the stationary platen 71 can be adjusted to accommodate a wide variety of chases using materials of different thickness.

In operation, then, the chase 26 is loaded with porous material 59 and die 61 with the piece of release paper 63 preferably placed therebetween. The thicknesses are such that the chase cannot be locked together. Cold press 27 is then used to force the plates 48 and 49 together so that the chase can be locked together. This exerts a pressure of 5000 to 6000 pounds per square inch on the material and the die. The locked chase is then placed on the hot plate by placing it underneath plate 17. The chase is then heated on the hot plate until it reaches 120° as measured by an industrial thermometer. The temperature is checked periodically by slidingly removing the plate 17 to look at the thermometer. When the correct temperature is reached, chase 26 is removed from the hot plate and cooled to about 90°, at which time the chase may be unlocked. The porous stamp material shrinks under the temperature and pressure used so that it is not necessary to put any pressure on the chase to remove the locking rods. The porous material retains as an embossment the mirror image of the graphics in depressed area 62 of die 61. The embossed porous material may then be cut, with the embossed portion placed on a stamp where it is now ready to be impregnated with ink and used for a long period of time without further inkings.

When applying pressure, the handle 28 can be pumped without the risk of upsetting the machine 11, because of stabilized plate 16. Safety plate 17 reduces any chance of unfortuitous burnings due to contact with the hot plate 18.

The apparatus is simple to operate, requiring a minimum of technical ability. One merely sets the dial to the required temperature. There is no need to judge the amount of pressure applied to the console press, since adequate pressure is applied to allow locking rods 54, 56 to be inserted in place to lock chase 26 shut. There also is no need to time the various steps, since application of heat is all that has to be watched. Bringing the material in the chase up to the required temperature insures a proper embossment. Thus, it may be seen that a pre-inked stamp formed of foamed porous polyvinyl chloride material may be easily and readily prepared, having thereon selected graphics when such graphics are first molded, in negative or mirror-image form, on a plastic, bakelite die.

While the principles of the invention have been described above in connection with specific apparatus and applications, it is to be understood that this description is made only by way of example, and not as a limitation on the scope of the invention.

I claim:

1. A method for embossing porous foam material for use in pre-inked stamps, said porous material having the property of retaining a memory of the intagliated graphics embossed on a die when said porous foam material is heated and cooled, said method comprising the steps of:

placing said porous foam material juxtaposed to said die having the desired graphics thereon;

compressing said porous foam material against said die without applying heat; and heating but not melting said porous foam material while continuing to compress said porous foam material against said die.

2. The method of claim 1, further comprising the steps of:

placing said porous foam material juxtaposed to said die into a two piece chase without applying heat;

locking said chase together, thereby applying pressure to said porous foam material; and heating said locked chase until said porous foam material shrinks and retains a memory of the embossment thereon caused by said die.

3. The method as described in claim 2, wherein a pressure of between 5,000 and 6,000 pounds per square inch is placed on said porous material and said die when said chase is locked.

4. The method as recited in claim 1, further comprising the step of:

cooling said porous material in said chase after heating.

5. The method as recited in claim 4, wherein said chase is heated until it reaches 120° F and cooled until it reaches about 90° F.

6. The process as described in claim 1, wherein said foam material includes a mixture of the following:

| | Parts (substantially) |
|---|---|
| Plastisol resin | 100 |
| Dipropylene glycol dibenzoate | 45 |
| Dicapryl phthalate | 35 |
| Epoxy plasticizer | 5 |
| Frothing agent and stabilizer | 15 |
| Magnesium silicate having an average chemical composition (by weight) of: 29% McO, 57% $SiO_2$, 8% CaO, 2% $Al_2O_3$, $Fe_2O_3$ and 4% ignition loss | 15 |

7. The process as described in claim 1, wherein said porous foam material includes a mixture of the following:

| | Parts (substantially) |
|---|---|
| Plastisol resin | 100 |
| Butyl benzyl phthalate | 45 |
| Dioctyl phthalate | 35 |
| Dibasic lead phosphite | 5 |
| Frothing agent and stabilizer | 15 |

8. The process as described in claim 1, wherein said porous foam material includes a mixture of the following:

| | Parts (substantially) |
|---|---|
| Plastisol resin | 100 |
| Butyl benzyl phthalate | 35 |
| Dicapryl phthalate | 30 |
| Low temperature epoxy plasticizer | 5 |
| Frothing agent and stabilizer | 12½ |

9. The process as described in claim 1, wherein said porous foam material includes a mixture of the following:

| | Parts (substantially) |
|---|---|
| Plastisol resin | 100 |
| Dipropylene glycol dibenzoate | 45 |
| Dioctyl phthalate | 15 |
| Low temperature epoxy plasticizer | 5 |
| Cresyl diphenyl phosphate | 20 |
| Frothing agent and stabilizer | 15 |

10. The process as described in claim 1, wherein said porous foam material includes a mixture of the following:

| | Parts (substantially) |
|---|---|
| Plastisol resin | 85 |
| Copolymer dispersion resin | 15 |

-continued

| | Parts (substantially) |
|---|---|
| Dipropylene glycol dibenzoate | 45 |
| Dioctyl phthalate | 35 |
| Low temperature epoxy plasticizer | 5 |
| Frothing agent and stabilizer | 15 |

11. The process as described in claim 1, wherein said porous foam material includes a mixture of the following:

| | Parts (substantially) |
|---|---|
| Plastisol resin | 60 |
| Copolymer dispersion resin | 40 |

-continued

| | Parts (substantially) |
|---|---|
| Low temperature epoxy plasticizer | 5 |
| Frothing agent and stabilizer | 15 |

12. The process as described in claim 2, wherein said porous foam material includes a mixture of the following:

| | Parts (substantially) |
|---|---|
| Plastisol resin | 100 |
| Dioctyl phthalate | 16 |
| Dipropylene glycol dibenzoate | 45 |
| Low temperature epoxy plasticizer | 5 |
| Frothing aid and stabilizer | 11 |

* * * * *